United States Patent [19]

Nazri et al.

[11] Patent Number: 5,743,921
[45] Date of Patent: Apr. 28, 1998

[54] METHOD OF MAKING A CELL USING A LITHIUM-DEACTIVATED CARBON ANODE

[75] Inventors: Gholam-Abbas Nazri, Bloomfield Hills; Blake James Howie, Almont, both of Mich.

[73] Assignee: General Motors Corporation, Detroit, Mich.

[21] Appl. No.: 785,976

[22] Filed: Nov. 29, 1996

Related U.S. Application Data

[63] Continuation of Ser. No. 497,761, Jul. 3, 1995, abandoned.

[51] Int. Cl.⁶ .................................................. H01M 10/38
[52] U.S. Cl. .................................... 29/623.5; 429/194
[58] Field of Search .......................... 29/623.5; 429/194

[56] References Cited

U.S. PATENT DOCUMENTS

| | | | |
|---|---|---|---|
| 4,980,250 | 12/1990 | Takahashi et al. | 429/194 |
| 5,028,500 | 7/1991 | Fong et al. | 429/194 |
| 5,162,176 | 11/1992 | Herr et al. | 429/194 |
| 5,436,093 | 7/1995 | Huang et al. | 429/217 |
| 5,443,601 | 8/1995 | Doeff et al. | 29/623.5 |
| 5,503,946 | 4/1996 | Fauteux et al. | 29/623.5 X |
| 5,595,837 | 1/1997 | Olsen et al. | 429/194 |

FOREIGN PATENT DOCUMENTS

| | | |
|---|---|---|
| A-0201038 | 12/1986 | European Pat. Off. . |
| A-0484304 | 6/1992 | European Pat. Off. . |

OTHER PUBLICATIONS

European Search Report dated 9 Oct. 1996 corres to EP 96 20 1589.

"Increasing the Lithium Capacity of a Carbon Electrode", NASA Tech Briefs, vol. 19 No. 7, p. 52 (Jul. 1995).

*Primary Examiner*—John S. Maples
*Attorney, Agent, or Firm*—Lawrence B. Plant

[57] ABSTRACT

A method of making a secondary, cathode-loaded, lithium-ion cell having a carbon anode including the principal step of cathodizing the carbon in a non-aqueous lithium-ion-conducting solution to deactivate the carbon by neutralizing or passivating any active sites therein.

15 Claims, 9 Drawing Sheets

METHOD OF MAKING A CELL USING A LITHIUM-DEACTIVATED CARBON ANODE

This is a continuation of application Ser. No. 08/497,761 filed on Jul. 3, 1995, now abandoned.

This invention relates to secondary, lithium-ion cells having Li-intercalatable carbon anodes, and more particularly to a method for lithium deactivation of active sites on the carbon prior to assembling the cells.

BACKGROUND OF THE INVENTION

Secondary, lithium-ion cells and batteries are well known in the art. One such lithium-ion cell comprises essentially a carbonaceous anode (e.g., carbon fiber), a lithium-retentive cathode, and a non-aqueous, lithium-ion-conducting electrolyte therebetween. The carbon anode comprises any of the various forms of carbon (e.g., coke, graphite etc.) which are capable of reversibly retaining lithium species, and which are bonded to an electrically conductive carrier (e.g. copper foil) by means of a suitable organic binder. The cathode comprises such materials as electronically conductive polymers (e.g., polyaniline, polythiophene and their derivatives) or transition metal chalcogenides which are bonded to an electrically conductive carrier (e.g., aluminum foil) by a suitable organic binder.

Carbon anodes and transition metal chalcogenide cathodes reversibly retain lithium species by an intercalation mechanism wherein lithium species become lodged within the lattices of the carbon and chalcogenide materials. In the carbon anode, there is a partial charge transfer between the lithium species and the p bonds of the carbon, whereas in the metal chalcogenide cathode there is nearly a total charge transfer between the lithium species and the transition metal component of the metal chalcogenide. Chalcogenides known to be useful in lithium-ion cells include oxides, sulfides, selenides, and tellurides of such metals as vanadium, titanium, chromium, copper, molybdenum, niobium, iron, nickel, cobalt and manganese with nickel and cobalt oxides being among the more popular cathode materials used commercially. Manganese oxide has been proposed as a low cost alternative to the nickel and cobalt oxides.

Lithium-ion cell electrolytes comprises a lithium salt dissolved in a vehicle which may be (1) completely liquid, or (2) an immobilized liquid, (e.g., gelled, or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, and polycarbonates, and may be polymerized in situ in the presence of the electrolyte to trap the electrolyte therein as the polymerization occurs. Known polymers for pure polymer electrolyte systems include polyethylene oxide (PEO), polymethylene-polyethylene oxide (MPEO) or polyphosphazenes (PPE). Known lithium salts for this purpose include, for example, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, and $LiO_2CF_3$, $LiAsF_6$, and $LiSbF_6$. Known organic solvents for the lithium salts include, for example, propylene carbonate, ethylene carbonate, dialkyl carbonates, cyclic ethers, cyclic esters, glymes, lactones, formates, esters, sulfones, nitrites, and oxazolidinones.

Lithium cells made from pure polymer electrolytes or liquid electrolytes entrapped in a polymer matrix are known in the art as "lithium-polymer" batteries. Lithium-polymer cells are often made by laminating thin films of the anode, cathode and electrolyte together wherein the electrolyte layer is sandwiched between the anode and cathode layers to form an individual cell, and a plurality of such cells bundled together to form a higher energy/voltage battery.

One known approach to manufacturing lithium-ion cells having carbon anodes is to preload the lithium-retentive cathode material with all of the lithium the cell requires before assembling the cell. Carbon-anode, lithium-ion cells assembled from lithium-retentive cathodes which have been preloaded with lithium are hereinafter referred to as "cathode-loaded" cells. In the case of transition metal chalcogenides, this is preferably accomplished during the manufacture of the metal chalcogenide material itself, since it has been found that lithium-metal chalcogenides (e.g., $LiMn_2O_4$) can be manufactured having a desirable crystal structure for intercalating larger quantities of lithium species.

Unfortunately, "cathode-loaded" cells have some problems. In the first place, cathode-loaded cells are inefficient because some of the initial capacity of the cell (i.e., as measured by the amount of lithium preloaded into the cathode) is lost during the first charge-discharge cycle of the cell in that it is not thereafter available for subsequent reversible interaction with the electrodes. As a result, it has become common practice to provide cathode-loaded cells with excess preloaded cathode material when the cell is first assembled in order to compensate for the amount of lithium expected to be lost (i.e., rendered irreversible) in the first cycle. This, of course, results in a cell having electrodes which are stoichiometrically unbalanced, as far as their relative reversible lithium retention capability is concerned, since after the first cycle more lithium-retention capacity (i.e., more cathode material) resides in the cathode than is needed to accommodate the reversible lithium species intercalated in the carbon anode. Such excess cathode material adds to the size, weight and cost of the cell. In the second place, cathode-loaded/carbon cells tend to gas during the first cycle of the battery incident to decomposition of the electrolyte's solvent. Such gassing not only produces a combustible gas, but can cause delamination of laminated electrodes in full assembled cells, swelling of sealed cells, separation of the active material from its metal substrate current collector and depletion and contamination (i.e., by reaction byproducts) of the electrolyte all of which contribute to increase the cells internal resistance. Finally, cathode-loaded cells are typically assembled with electrolyte-unsaturated carbon anodes which only become fully wetted with electrolyte after the cell's first cycle incident to electrolyte being carried from the electrolyte region of the cell into the carbon by the migrating lithium ions. Such movement of electrolyte out of the electrolyte region and into the carbon anode is particularly troublesome in immobilized-electrolyte cells, since the electrolyte region is depleted of some of its electrolyte and accordingly results in increased internal resistance within the cell.

The aforesaid problems are particularly troublesome in larger batteries such as might be used to propel an electric or hybrid-electric vehicle. The first and second of the these problems are seen to be attributed at least in part to the presence of "active sites" throughout the carbon crystals. Active sites are defect, surface and edge sites which are characterized by unsaturated interatomic bonds that are prevalent on the ends of the carbon chains and at stacking faults or cracks in the carbon. Such sites have energy potentials above the electrodeposition potential of lithium. High concentrations of active sites are particularly prevalent in a not fully graphitized carbon. Active carbon sites are troublesome in cathode-loaded cells because they are seen to promote (1) decomposition of the electrolyte's solvent, (2) gassing within the assembled cell incident to such decomposition, and (3) the non-useful consumption of some of the preloaded lithium thereby rendering such lithium no longer available for reversible interaction between the electrodes. Moreover, the extent of electrolyte decomposition is sensitive to the surface area of the carbon. Smaller carbon particles tend to have more active sites, and accordingly result in more decomposition of the prelithiation solution. The first problem may also be due to certain characteristics inherent in the cathode material itself. Hence, for example, some chalcogenides (e.g., vanadium oxide) have a very high (nearly 100%) first cycle efficiency (i.e., against deactivated carbon). On the other hand, Li-manganese oxide cathodes have only about 90%–95% first cycle efficiency (i.e., against deactivated carbon) owing to an inherent inability of the manganese oxide cathode to give up all of its lithium to the anode. Indeed, seemingly some (i.e., ca 5%–10%) of the $LiMn_2O_4$ decomposes in the cathode so as to make intercalatable sites available but without actually transferring lithium from the cathode to the anode. The third problem is attributed to assembly of cathode-loaded cells using dry carbon anodes.

SUMMARY OF INVENTION

The present invention overcomes the aforesaid problems by lithium-deactivation and prewetting of carbon anodes destined for subsequent assembly into cathode-loaded cells. The present invention relates to the method of making a cathode-loaded, secondary, lithium-ion cell wherein a lithium-intercalatable, carbon anode is positioned opposite a lithium-retentive cathode preloaded with a quantity of lithium species with a non-aqueous, lithium-ion-conducting electrolyte therebetween (i.e., separating the anode from the cathode). More specifically, the present invention contemplates the improvement wherein the lithium-preloaded cathode material present is substantially only enough to provide that quantity of lithium species as is needed to satisfy the lithium intercalation capacity of the carbon anode, and to reversibly shuttle back and forth between the anode and cathode during charge-discharge cycling of the cell. Substantially no extra preloaded cathode material is provided to compensate for lithium species which are nonusefully lost to the active sites of the carbon anode during the first cycle. The only extra amount present, if any, is to compensate for any inefficiency that is inherent to a particular preloaded cathode material ($LiMn_2O_4$). This leads to the fabrication of batteries having balanced or closely-matched electrodes (i.e., reversible-lithium-capacity-wise), as well as higher energy and power densities. This goal is obtained by subjecting the carbon to a controlled cathodization opposite a counterelectrode in a non-aqueous, lithium-ion-conducting, electrolyzing solution before the lithium-ion cell is assembled so as to (1) prewet, and preferably saturate, the carbon with such solution, (2) prelithiate the carbon by depositing substantially only enough lithium from such solution in the carbon as is needed to deposit at and deactivate the active sites on the carbon, and (3) leave the carbon with substantially only enough residual lithium-retention capacity to reversibly intercalate the amount of reversible lithium preloaded into the cathode. In those circumstances where the cathode (e.g., $LiMn_2O_4$) material itself is inherently inefficient, a small amount of additional Li species may be intercalated into the carbon following deactivation to compensate for at least some of such cathodes inefficiency.

The prelithiation, cathodizing solution will preferably have the same composition as the galvanic cell's electrolyte for best compatibility with the galvanic cell's electrolyte. The prelithiation counterelectrode will preferably comprise lithium to avoid electrolytic decomposition of the cathodizing solution at the counterelectrode. Alternatively, the prelithiation solution may comprise a non-aqueous, lithium salt solution having a different composition than the galvanic cell's electrolyte, and/or the counterelectrode may comprise an electrochemically inactive material such as platinum.

Prelithiation cathodization in accordance with the present invention will preferably be conducted under substantially constant current conditions, and most preferably at a current density of at least about 2.5 milliamps per square centimeter ($mA/cm^2$) at the carbon anode. Under such constant current cathodization conditions, the voltage between the carbon and the counterelectrode is monitored, and cathodization continued until the voltage falls below the reduction decomposition potential of the electrolyte on the carbon at which time, prelithiation/cathodization can be discontinued. However, cathodization/prelithiation will preferably be briefly continued thereafter to intercalate a small but sufficient amount of lithium in the carbon to compensate for any first cycle irreversibility/inefficiency propensity of some cathode materials (e.g., $LiMn_2O_4$). Intercalating the carbon with up to about ten percent (10%) of the lithium capacity of the cathode material is typically adequate for this purpose and depends on which cathode material used. This small amount of lithium intercalated into the carbon immediately following prelithiation to compensate for the cathodes inherent, first cycle inefficiency, is hereinafter referred to as buffer-lithium. Alternatively, the carbon could be cathodized at a constant voltage (i.e., below the electrolytic decomposition potential of the solution), and the current monitored until it falls to about zero, at which time, prelithiation/cathodization is discontinued. A small amount of buffer-lithium may then be intercalated into the carbon as may be needed to compensate for a particular cathode material.

Higher current densities (i.e., above about 2.5 $mA/cm^2$) not only reduce treatment times, but improve the energy capacity of the carbon. Dropping of the cathodizing voltage below the decomposition potential or the current to zero, as appropriate, indicates that all of the active sites have been deactivated, and that substantially only lithium intercalation capacity remains in the carbon.

In accordance with a preferred embodiment of the invention, the lithium-ion, galvanic cell's cathode will comprise a transition metal chalcogenide, and the electrolyte will be immobilized between the anode and the cathode. Most preferably, the transition metal chalcogenide will comprise manganese oxide, the electrolyte will be immobilized in a polymer matrix (i.e., a lithium-polymer cell) and the carbon anode will contain up to about 10% buffer-lithium.

DETAILED DESCRIPTION OF THE INVENTION

The invention will better be understood when considered in the light of the following detailed description of certain specific embodiments thereof which is given hereafter in conjunction with the several drawings in which:

BRIEF DESCRIPTION OF THE DRAWINGS

FIG. 1 schematically depicts a preferred electrolytic cell for the continuous prelithiation/cathodization of carbon anodes in accordance with the present invention. The electrolytic cell comprises a tank 2 having an electrolyte 4 therein which comprises a non-aqueous, lithium-ion-conducting solution of the type commonly used as an electrolyte in lithium-ion cells, supra. A strip of carbon material 6 moves through the tank 2 beneath the electrolyte 4 opposite a counterelectrode 8. The carbon strip comprises a metal foil (e.g., copper) having carbon particles (preferably fibers) adhering thereto by means of an appropriate organic binder admixed with the carbon fibers. A preferred binder comprises ethylene propylene diene monomer (EPDM) because it is readily dissolvable in xylene and forms a very homogeneous solution. Other suitable binders include polyvinyl fluoride (PVDF), polytetrafluoroethylene (PTFE), and polymers which are commonly used as electrolyte matrices supra. The carbon strip 6 is unwound from a reel 10, passed beneath rollers 12 and 14, and wound unto reel 16 after prelithiation occurs in the tank 2. The counterelectrode 8 comprises lithium which supplies lithium ions to the electrolyte 4 during prelithiation, and thereby avoids electrolytic dissociation of the solution 4 at the counterelectrode 8.

Figure 1:
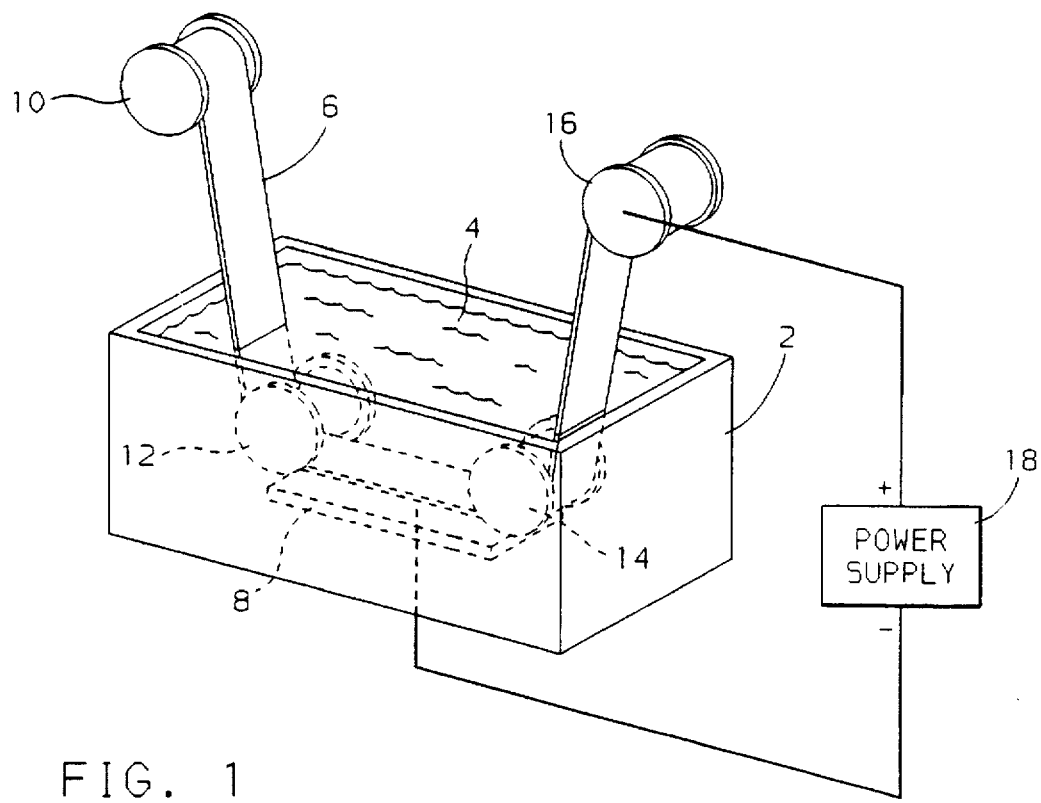
FIG. 1 is a schematic illustration of an electrolytic cell for continuously cathodizing carbon anodes in accordance with the present invention.

Though there is no advantage to do so, the counterelectrode 8 in FIG. 1 could comprise an electrochemically inactive material such as platinum. When an electrochemically inactive counterelectrode 8 is used, decomposition of the electrolyzing solution 4 occurs at the counterelectrode 8. Such decomposition of the electrolyzing solution 4 can cause the formation and build up of contaminants in the solution 4 which, over time, could interfere with the prelithiation process. Moreover, use of an inactive counterelectrode 8 causes depletion of lithium ions from the electrolyzing solution 4 which, over time, necessitates replenishment of the lithium ions therein. Accordingly in the event an inactive counterelectrode 8 is used, it would be desirable to circulate the solution 4 through an auxiliary treatment tank (not shown) to filter out any insoluble contaminates, and to replenish the lithium ion content of the solution 4.

A power supply 18 couples the carbon strip 6 to the counterelectrode 8 so as to render the strip 6 cathodic with respect to the counterelectrode 8 and such that, upon passage of current through the system, the carbon strip 6 is cathodized in the solution 4. This cathodization is controlled to the extent that it continues for only so long as is necessary to deactivate the active sites on the carbon. In other words cathodization proceeds so long as there are active sites remaining and then stops after active site deactivation is complete and before any substantial intercalation of lithium into the carbon occurs. During this controlled cathodization, lithium preferentially deposits at the active sites on the carbon, and then reacts with the solvent in the electrolyzing solution 4 to form a passivating film on the active sites. For example, when a carbonate-based solvent (e.g., ethylene or propylene carbonate) is used, this passivating film is believed to contain lithium carbonate. This controlled cathodization and selective deposition of lithium at the active sites is hereinafter referred to as "prelithiation", and serves to: (1) prevent decomposition of the electrolyte in the galvanic cell after assembly thereof; (2) permit matching of the relative capacities of the anode and cathode with respect to reversible lithium species; and (3) pre-wets the carbon with a lithium ion conducting electrolyte prior to its being assembled into a galvanic cell. Preferably, the carbon anode will be completely saturated with the cathodizing solution by the time complete active site deactivation has occurred, thereby avoiding any depletion of the electrolyte from the electrolyte region of the galvanic cell after the cell has been assembled. Such saturation of the carbon anode is particularly important in starved-electrolyte systems such as are found in lithium-polymer cells.

Prelithiation/cathodization will preferably be effected under constant current conditions and generally in the range of about 0.1 mA/cm$^2$ to about 8 mA/cm$^2$ of carbon electrode (i.e., based on the electrodes apparent surface—not its internal microsurface). Preferably, the current density will be at least about 2.5 mA/cm$^2$. While lower current densities are effective, cathodizing at such higher current densities not only accelerates the prelithiation process, but seemingly renders the carbon more passive/inactive and tends to improve the energy capacity of the electrode more so then if the carbon had been prelithiated at a lower current density. In this regard, prelithiation at current densities greater than about 2.5 mA/cm$^2$ produces a thin but highly dense film which is more passive than the less dense, thicker films produced at lower current densities.

During prelithiation at constant current, the voltage between the carbon electrode 6 and counterelectrode 8 is monitored. This voltage starts out high and progressively declines over a period of time as the active sites are deactivated. By the time the voltage drops to below about 0.6V, deactivation is complete. Continued cathodization to still lower voltages intercalates some buffer-lithium into the carbon if needed for a particular cathode material. Prelithiation can also be effected under constant voltage conditions by controlling the voltage of the carbon electrode lower than the electrolyte decomposition voltage and monitoring the current between the electrodes 6 and 8 until it falls close to zero at the end of prelithiation/deactivation of the carbon 6.

Different forms of carbon (e.g., coke, graphite, etc.), and even similar carbons provided by different manufacturers, require different lengths of time to completely deactivate them (i.e., at the same current density) since deactivation time is a direct function of the concentration of the active sites in the particular carbons. Materials which have relatively high concentrations of active sites, take longer to deactivate/prelithiate then carbons like coke which contain fewer active sites.

Carbon anodes may be made by a variety of techniques. For example, carbon particles (preferably fibers) may be pressed into a nickel foam under a pressure of about 1000 tons/cm$^2$. Another technique for making carbon anodes involves mixing the carbon particles with an organic binder, and applying it to an appropriate metal substrate (e.g., copper foil). One known such technique involves mixing about 5 percent to about 10 percent by weight ethylene propylene diene monomer (EPDM) with the carbon particles. In this regard, carbon particles are added to a 4 percent by weight solution of EPDM in a cyclohexane or xylene solvent to form a slurry. This slurry is then ground (e.g., by ball milling or micronizing) to a thick, ink-like consistency. The slurry is then poured onto a metal substrate and then drawn over the surface of the substrate with a doctor blade, or the like, to provide a layer of carbon on the substrate which layer has a thickness determined by the height of the doctor blade above the substrate and generally in the range of about 50 microns to about 200 microns. The solvent is allowed to evaporate so as to leave the carbon adhering to the substrate by means of the EPDM which has polymerized in the process. Still another technique for making such electrodes involves diluting the ground, ink-like slurry material discussed above with additional solvent (i.e., cyclohexane or xylene) and spraying it onto the metal substrate by means of an air brush type spray gun or the like.

SPECIFIC EXAMPLES

A number of test carbon electrodes were made from a variety of different carbons including PAN-based fibers, LSR coke, a proprietary carbon particulate, and a vapor grown, carbon fiber provided by Applied Science, Inc. of Dayton Ohio under the trade name PYROGRAFO® and which was produced by a process like that described in U.S. Pat. No. 5,024,818 and 5,324,415. One group of carbon electrodes was made by: (1) drying the carbon at 150° C., under 10$^{-3}$ torr vacuum; and (2) pressing (i.e., at 15 Mpa) between 5 mg to 20 mg of the carbon into an electroformed, open cell nickel foam having a porosity of about eighty percent (80%) to produce an electrode having an apparent surface area of 5 cm$^2$. Another group of carbon electrodes was made by: (1) mixing the active carbon with about 5% to about 10% conductive Shwinagen black and about 3% to about 7% by weight EPDM (i.e., as a 2%–4% solution in xylene or cyclohexane); (2) grinding the slurry for about three (3) min. in a McCrons' micronizing mill; (3) spreading the slurry to a thickness of about 100 microns onto a copper current collector; and (4) drying it at 100° C. under 10$^{-3}$ torr vacuum in the antectromber of a dry box filled with Argon gas. The electrode had an apparent surface area of 5 cm$^2$.

Figure 2:
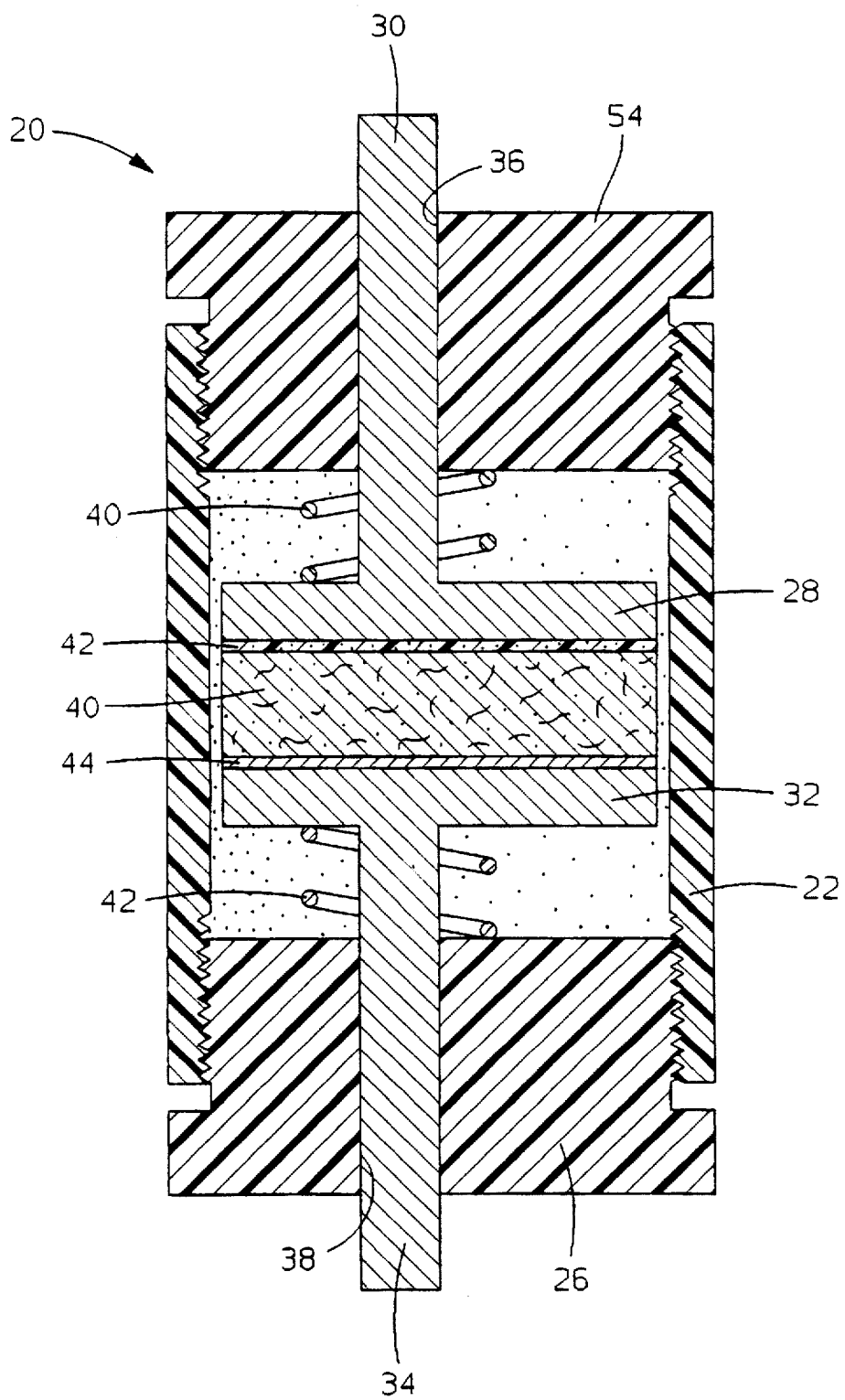
FIG. 2 depicts a cell used to prelithiate and test carbon electrodes.

Carbon electrodes made as set forth above were prelithiated/cathodized in a cell like that shown in FIG. 2.

FIG. 2 shows a test cell 20 comprising an annular polypropylene housing 22 having two threaded polypropylene end plugs 24 and 26. A nickel current collector 28 is connected by a nickel bar 30 to the exterior of the housing 27. A nickel current collector 32 is connected by a nickel bar 34 to the exterior of the housing 27. The bars 30 and 34 are adapted to slide axially in the respective openings 36 and 38 in end plugs 24 and 26 respectively for setting the spacing between the current collectors 28 and 32. Springs 40 and 42 bias the current collectors 28 and 32 toward each other to compress a glass mat 41 therebetween and provide an interelectrode gap of about 0.001 inch. The glass mat 41 is saturated with an electrolyte solution comprising one of the following electrolytes, i.e., (1) a one molar solution of lithium perchlorate in propylene carbonate, (2) a one molar solution of lithium perchlorate in a mixed solvent comprising a 66:34 mole percent mixture of ethylene carbonate and dimethylcarbonate, or (3) a one molar solution of LiPF$_6$ in a mixed solvent comprising a 66:34 mole percent mixture of ethylene carbonate and demethyl carbonate. The carbon anode material 42 being tested is attached to the current collector 28, and a lithium film 44 is attached to the current collector 32.

The cell was connected (i.e., via nickel bars 30 and 32) to a MACCOR battery cycler and data recorded on a PC386 computer. The battery cycler was programmed to apply a constant current to the electrodes during cathodization, and the interelectrode voltage (i.e., between the anode and the cathode) was monitored until the interelectrode voltage dropped below the electrolyte decomposition potential (i.e., about 0.6V) and a small amount (i.e., a few percent) of intercalation had commenced.

The carbon electrodes were prelithiated/cathodized at a constant current between 1 milliamp/cm$^2$ and about 100 milliamps/cm$^2$ of apparent surface area. Current densities above about 2.5 mA/cm$^2$ proved to be more beneficial than lower current densities in terms of removing the irreversible capacity of the carbon electrodes for the reasons set forth above. The time required for cathodization of the various carbon electrodes varied with the current density used and the concentration of the active sites in the particular carbon being treated. Treatment times generally varied from about 2 minutes to about 30 hours. Other samples were cathodized at a constant voltage close to the lithium potential. In the constant current prelithiation technique, the voltage between the carbon and the lithium electrodes was monitored and prelithiation terminated when the voltage fell below the decomposition potential of the electrolyte. Similarly in the prelithiation conducted at constant voltage, the current was monitored until it fell to near or at zero. When the voltage fell below the decomposition potential or the current reached zero or thereabout, as appropriate, prelithiation was terminated, and the carbon electrodes were charge-discharge tested by cycling at various current densities between 0.1 and 1.0 mA/cm$^2$ to determine their columbic charge-discharge efficiencies and hence the effectiveness of the prelithiation treatment. Some of those cycling tests were conducted in the prelithiation cell itself while others were conducted in separate test cells of the type carbon/electrolyte/lithium. Some of the carbon anodes, prelithiated as set forth above, were also assembled into cells of the type carbon/electrolyte/metal oxide and tested. The metal oxide cathodes of these latter cells contained about 5 percent to about 10 percent by weight conductive carbon particles for enhancing their electrical conductivity, and less than about 5 percent by weight EPDM binder for holding the oxides together and to an aluminum film substrate. These metal-oxide cathodes were formed by spraying thin films of the metal oxide, carbon, EPDM and solvent onto the aluminum substrate. The cells so made were charged and discharged at various constant currents between about 0.1 mA/cm$^2$ and about 8 mA/cm$^2$.

EXAMPLE 1

Figure 3:
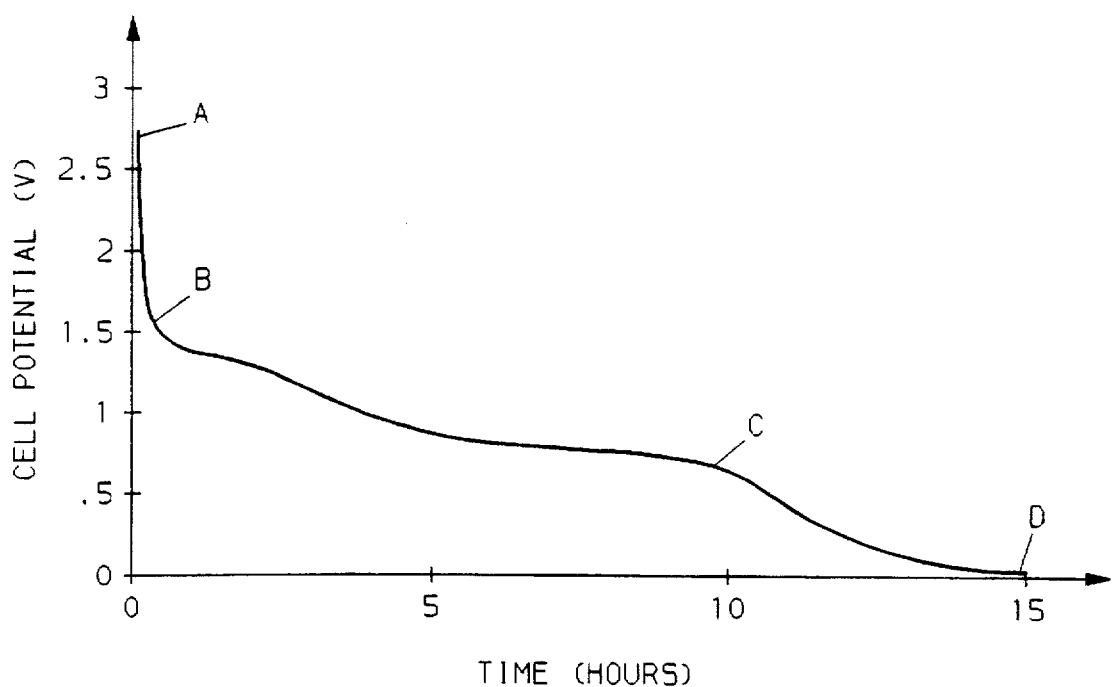
FIG. 3 is a typical voltage profile of a constant current prelithiation of a carbon anode.
Figure 4:
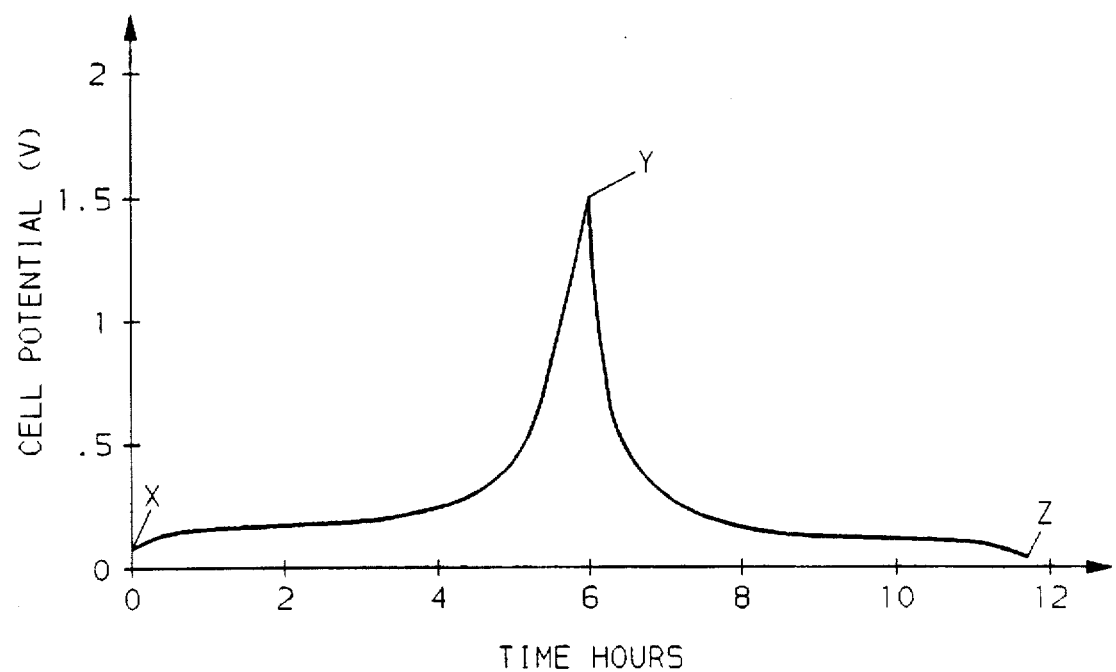
FIG. 4 is the voltage profile of a prelithiated carbon anode.

FIG. 3 shows the voltage profile for the prelithiation of a carbon electrode made from PYROGRAF® fibers, supra, cathodized/prelithiated at a current of 0.5 mA, and current density of 0.1 mA/cm$^2$ an electrolyte comprising a 1 molar solution of LiClO$_4$ in propylene carbonate. The voltage at the beginning of prelithiation (indicated at point A) was approximately 2.75 volts and quickly fell to about 1.55 volts (shown at point B). The voltage continued to drop at a much slower rate between points B and C which is hereinafter referred to as the electrolyte decomposition potential plateau, during which time the electrolyte decomposed, gases formed, and the active sites of the carbon were deactivated. Some lithium intercalation occurs in the voltage range between points C and D. Prelithiation/cathodization was terminated when the voltage dropped to about 50 millivolts. When so cathodized, the carbon electrode is fully saturated with the cathodizing solution and is highly reversible incident to the deactivation of the active carbon sites therein. In this regard, FIG. 4 shows the deintercalation/intercalation (i.e., charge/discharge) voltage profile of the same carbon electrode that was used to generate the prelithiation/cathodization curve of FIG. 3. This voltage profile was taken while the carbon electrode remained in the cathodization cell (FIG. 2), but after prelithiation was completed and some lithium intercalation had occurred (i.e., C-D of FIG. 3). The increasing voltage profile between points X and Y was generated when a constant charging current was applied to the carbon electrode by a MACORR cycler until the voltage reached 1.5 volts, at which time the direction of current flow was reversed and a decreasing voltage between points Y and Z was generated as lithium intercalated into the carbon. Cell voltage was monitored by a 386 PC computer using a MACORR cycling program.

Figure 5:
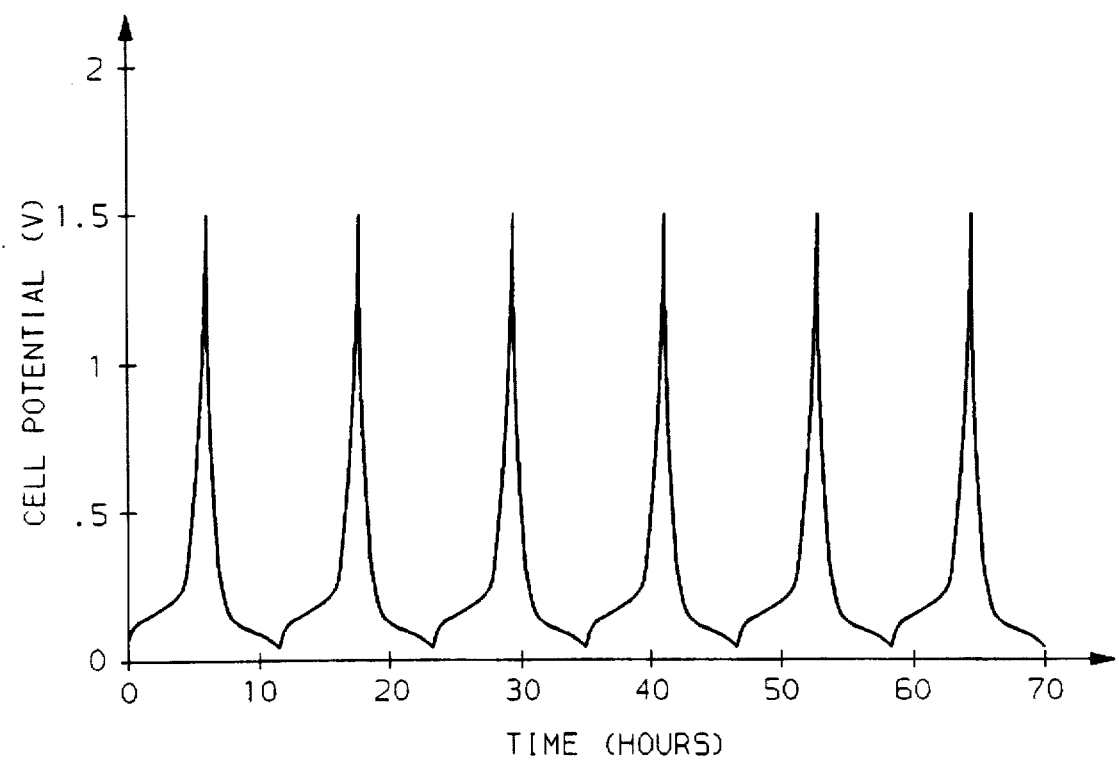
FIG. 5 is the voltage profile of a prelithiated carbon electrode during the course of several charge/discharge cycles following prelithiation.
Figure 6:
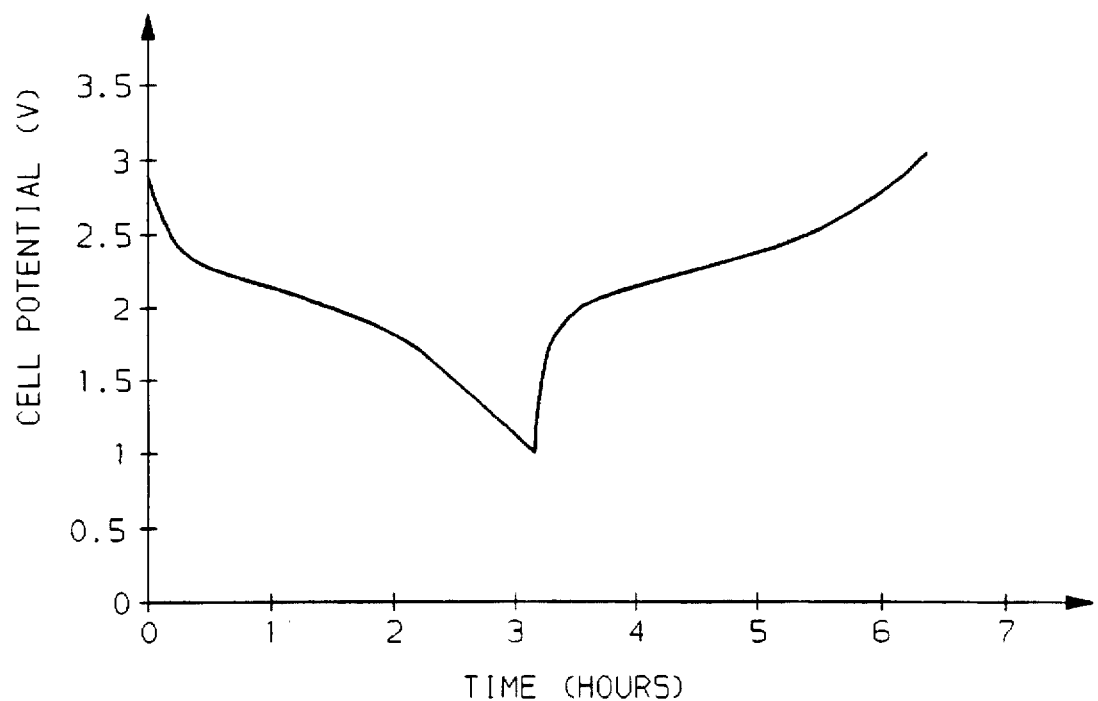
FIG. 6 is the voltage profile of a lithium ion cell made from a prelithiated carbon anode and a vanadium oxide cathode.
Figure 7:
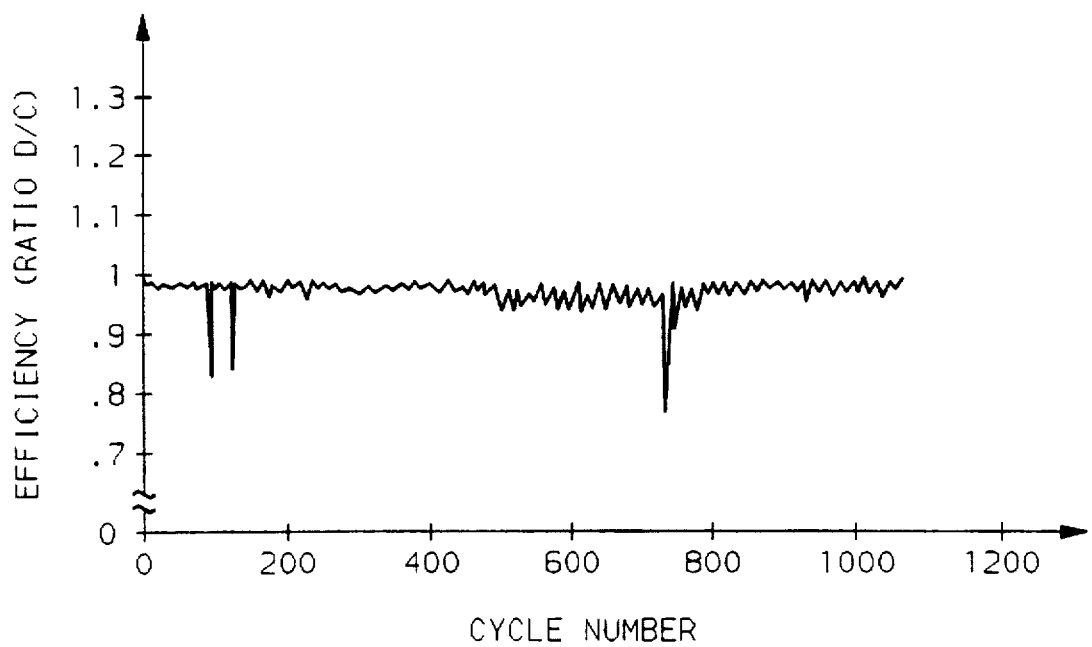
FIG. 7 is the cycling performance and efficiency of the carbon-vanadium oxide cell used to generate the profile of FIG. 6.

The symmetric shape of the voltage profile of FIG. 4 is indicative of completely reversible intercalation/deintercalation on the first cycle after prelithiation. FIG. 5 shows the cycling performance of the same carbon electrode used to generate the voltage profile in FIG. 4 over six cycles, and indicates 100 percent cycling reversibility and efficiency. Over 1000 reversible and efficient such charge/discharge cycles were obtained from such carbon electrodes. Finally, a galvanic cell was made from such a prelithiated carbon anode and a vanadium oxide cathode. That cell comprised a carbon electrode containing 11.7 milligrams of prelithiated carbon fiber on a copper film backing, 9.2 milligrams of EPDM bonded V$_6$O$_{13}$ cathode material on an aluminum film backing, and an electrolyte comprising a 1 molar solution of LiClO$_4$ in propylene carbonate. FIG. 6 shows the first discharge-charge voltage profile of the aforesaid galvanic cell. The cycling performance and efficiency of the cell, tested at 0.25 milliamps/cm$^2$, is shown in FIG. 7 over a period of 1000 efficient cycles.

EXAMPLE 2

Figure 8:
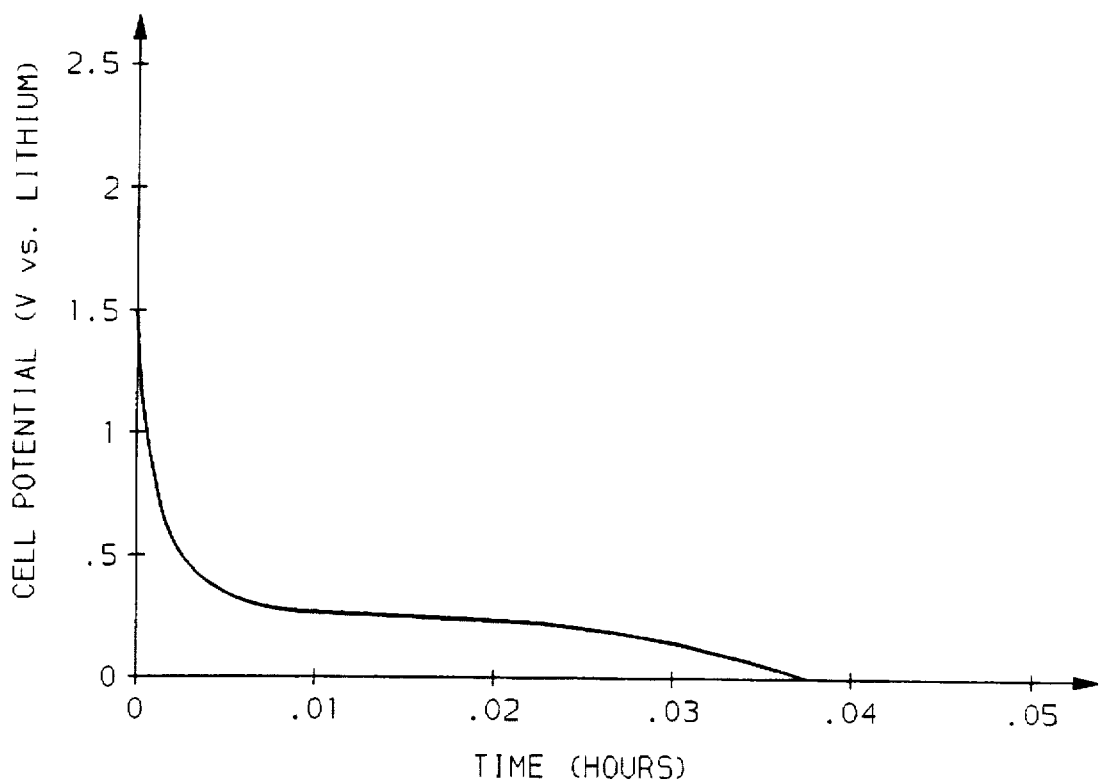
FIG. 8 is the voltage profile of the prelithiated carbon electrode of Example 2.

A carbon electrode containing 11.9 mg of active PYROGRAF® fibers, supra, was prelithiated/cathodized in the cell of FIG. 2 at a current of 40 mA and current density of 8 mA/cm$^2$ while monitoring the voltage between the carbon and lithium electrodes until it fell to 10 mV. The voltage profile of this electrode during cathodization is shown in FIG. 8. Subsequent charge-discharge cycling of the electrode at 1 mA/cm$^2$ in the FIG. 2 cell yielded a symmetrical voltage profile like that of FIG. 4 which indicated that the electrode was fully reversible.

EXAMPLE 3

Figure 9:
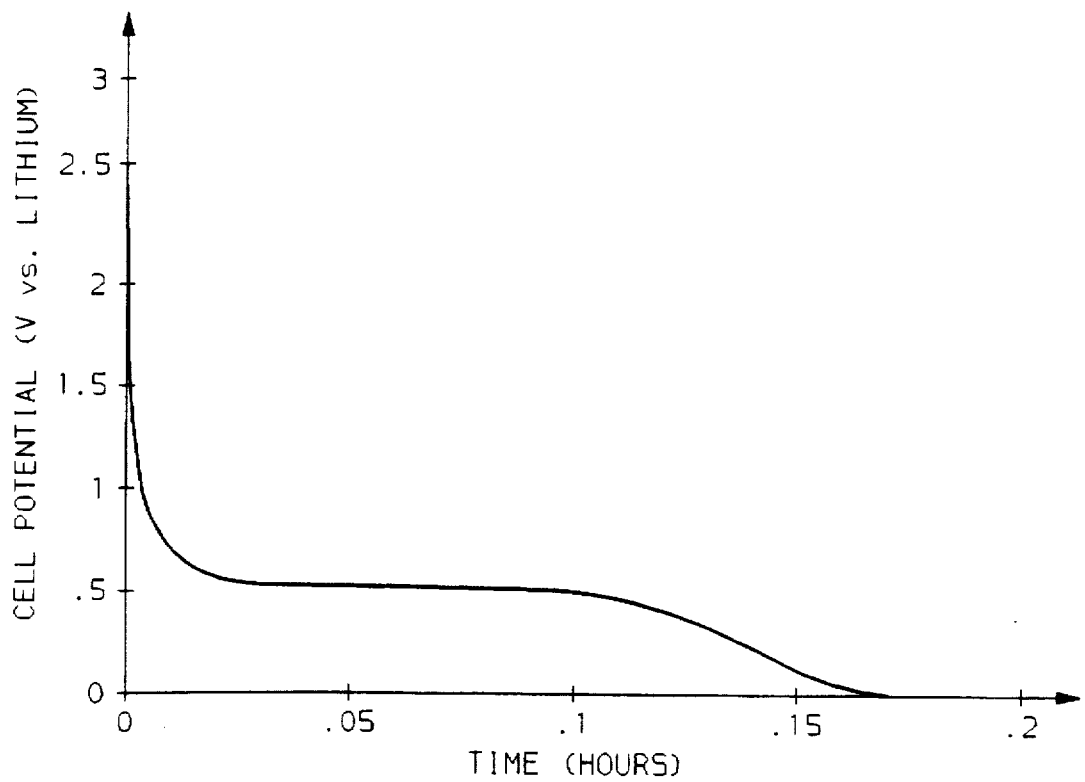
FIG. 9 is the voltage profile of the prelithiated carbon electrode of Example 3.

A carbon electrode containing 13 mg of PYROGRAF® fibers, supra, was prelithiated/cathodized in the cell of FIG. 2 at a current of 20 mA and current density of 4 mA/cm$^2$ while monitoring the voltage between the carbon and lithium electrodes until it fell to 10 mV. The voltage profile of this electrode during cathodization is shown in FIG. 9. Subsequent charge-discharge cycling of the electrode at 1 mA/cm$^2$ in the FIG. 2 cell yielded a symmetrical voltage profile like that of FIG. 4 which indicated that the electrode was fully reversible.

EXAMPLE 4

Figure 10:
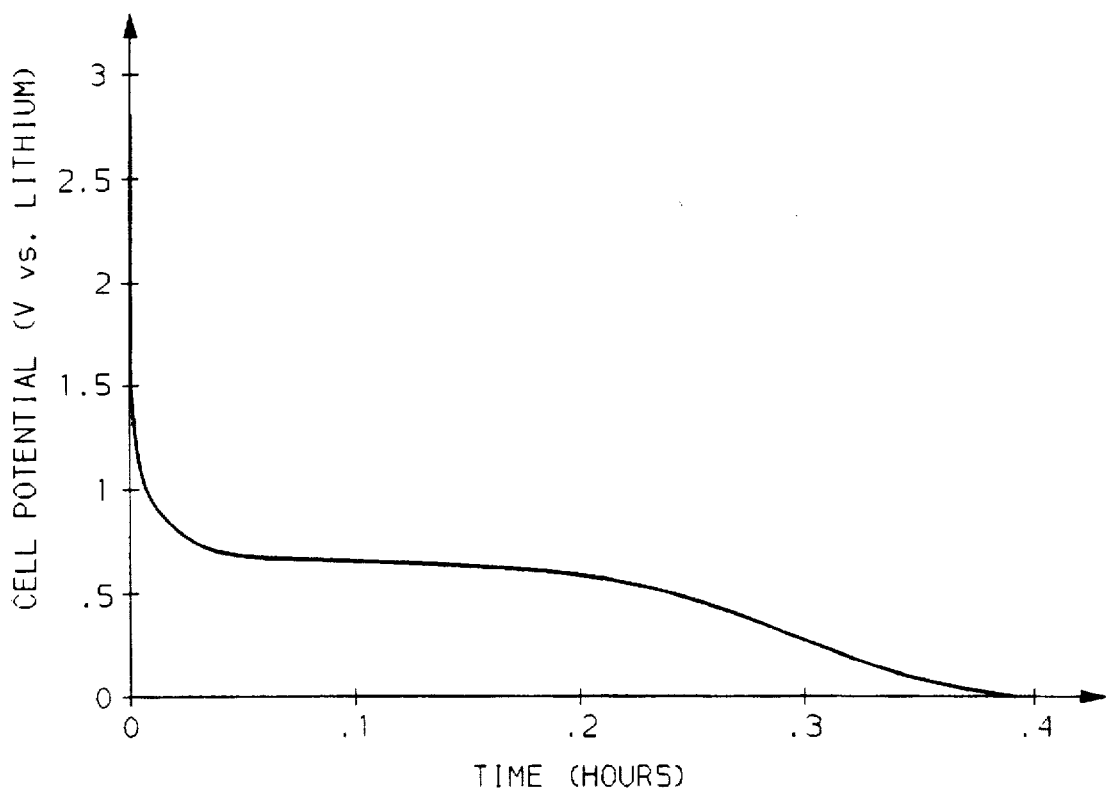
FIG. 10 is the voltage profile of the prelithiated carbon electrode of Example 4.
Figure 11:
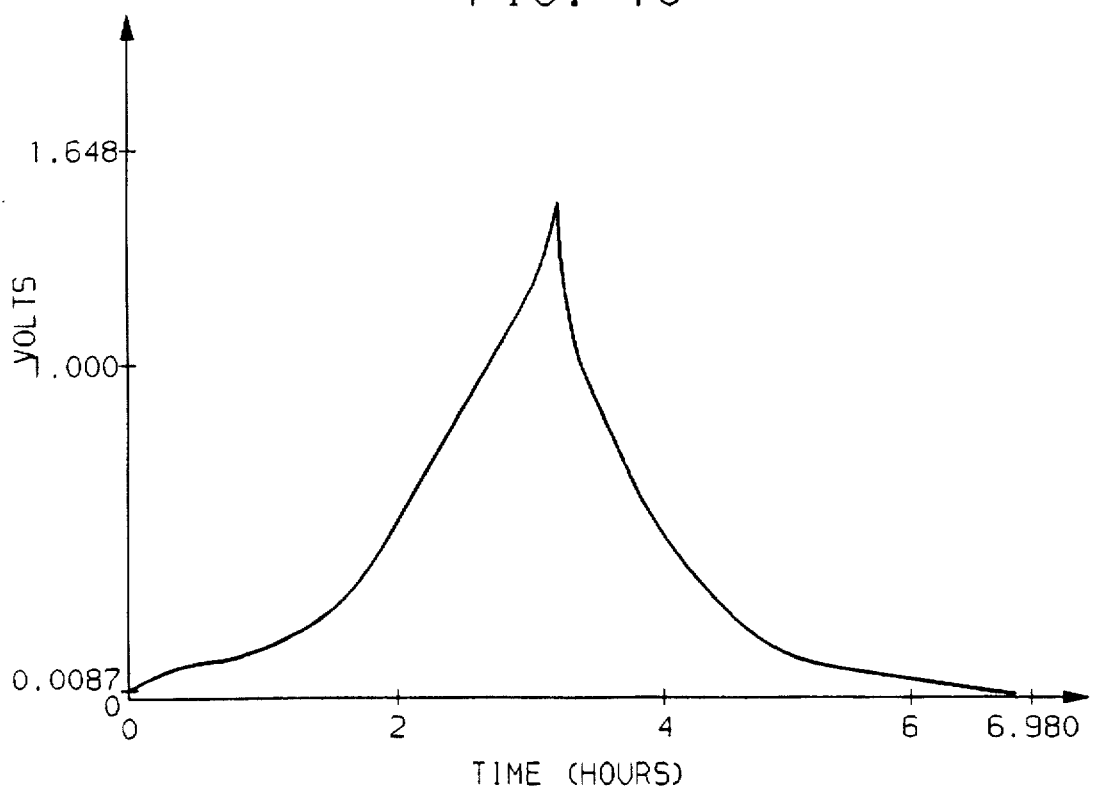
FIG. 11 is a plot of a charge-discharge cycle of the electrode of Example 4.

A carbon electrode containing 12.8 mg of PYROGRAF® fibers, supra, was prelithiated/cathodized in the cell of FIG. 2 at a current of 10 mA and current density of 2.5 mA/cm$^2$ while monitoring the voltage between the carbon and lithium electrodes until it fell to 10 mV. The voltage profile of this electrode during prelithiation/cathodization is shown in FIG. 10. Subsequent charge-discharge cycling of this electrode at 1 mA/cm in the FIG. 2 cell is shown in FIG. 11 and indicates full reversibility.

EXAMPLE 5

Figure 12:
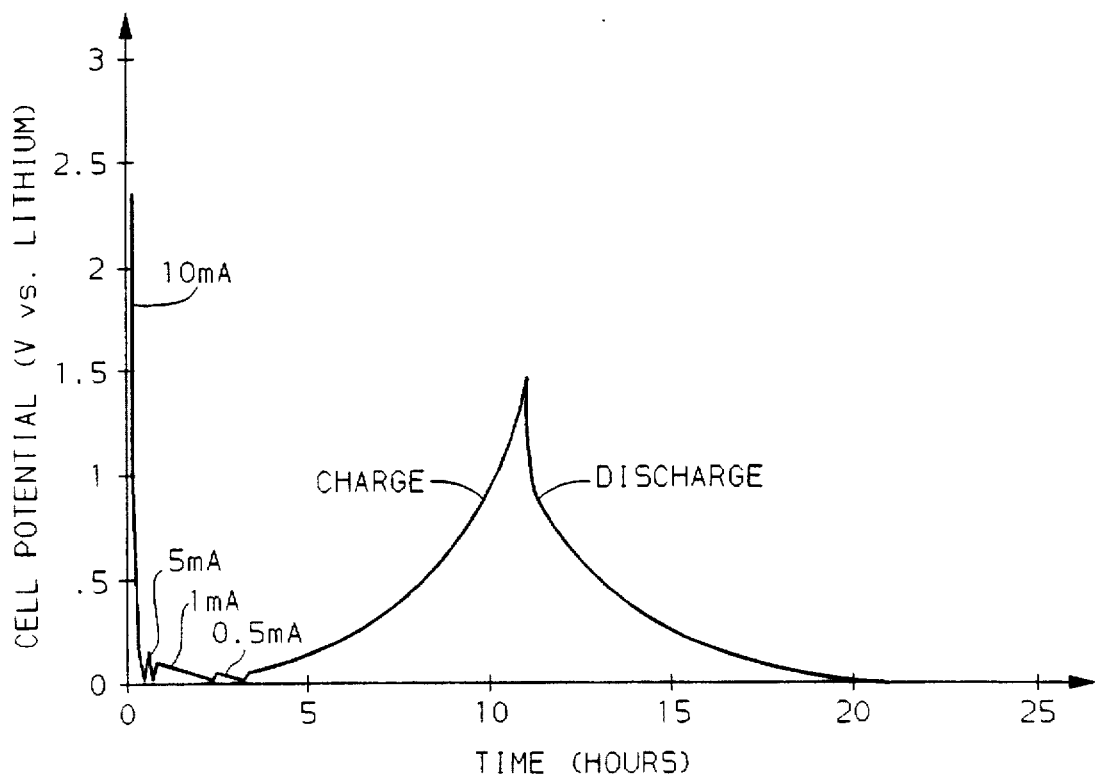
FIG. 12 are the voltage profiles during prelithiation and subsequent deintercalation and intercalation of the electrode of Example 5.

A carbon electrode containing 3.1 mg of PYROGRAF® carbon was prelithiated/cathodized by pulsing with a series of declining currents (i.e., 10, 5, 1, and 0.5 mA) until the active sites were removed and electrode became fully intercalated. The voltage profiles during prelithiation and for subsequent lithium deintercalation and intercalation are shown in FIG. 12. Deactivation occurred during the 10 mA pulse and lithium intercalation during the 5, 1 and 0.5 mA pulses. The capacity of the electrode was higher than that of electrodes prelithiated at lower current densities as indicated by the large area under the charge-discharge curve to the right of the prelithiation profile. Moreover, this test demonstrates that the application of various current or voltage pulses can be used to remove the reactive sites on carbon electrodes.

EXAMPLE 6

Figure 13:
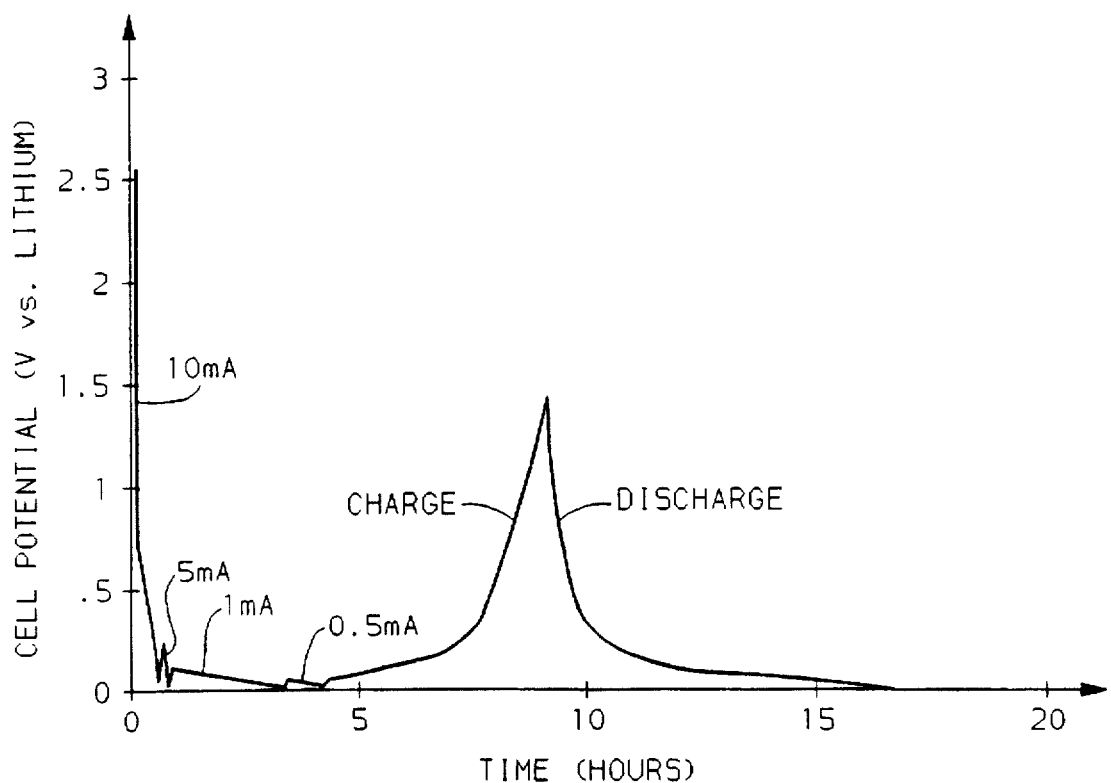
FIG. 13 is the voltage profile during prelithiation and subsequent deintercalation and intercalation of the electrode of Example 6.

A carbon electrode made from 11.6 mg of LSR coke was prelithiated/cathodized under the same conditions as set forth in Example 4 and the results thereof are shown in FIG. 13. Subsequent cycling of the LSR coke after prelithiation steps demonstrated a reversible lithium intercalation capacity of 179 mAh/g which corresponds to an intercalation capacity of one lithium atom per twelve carbon atoms (i.e., LiC$_{12}$).

EXAMPLE 7

Figure 14:
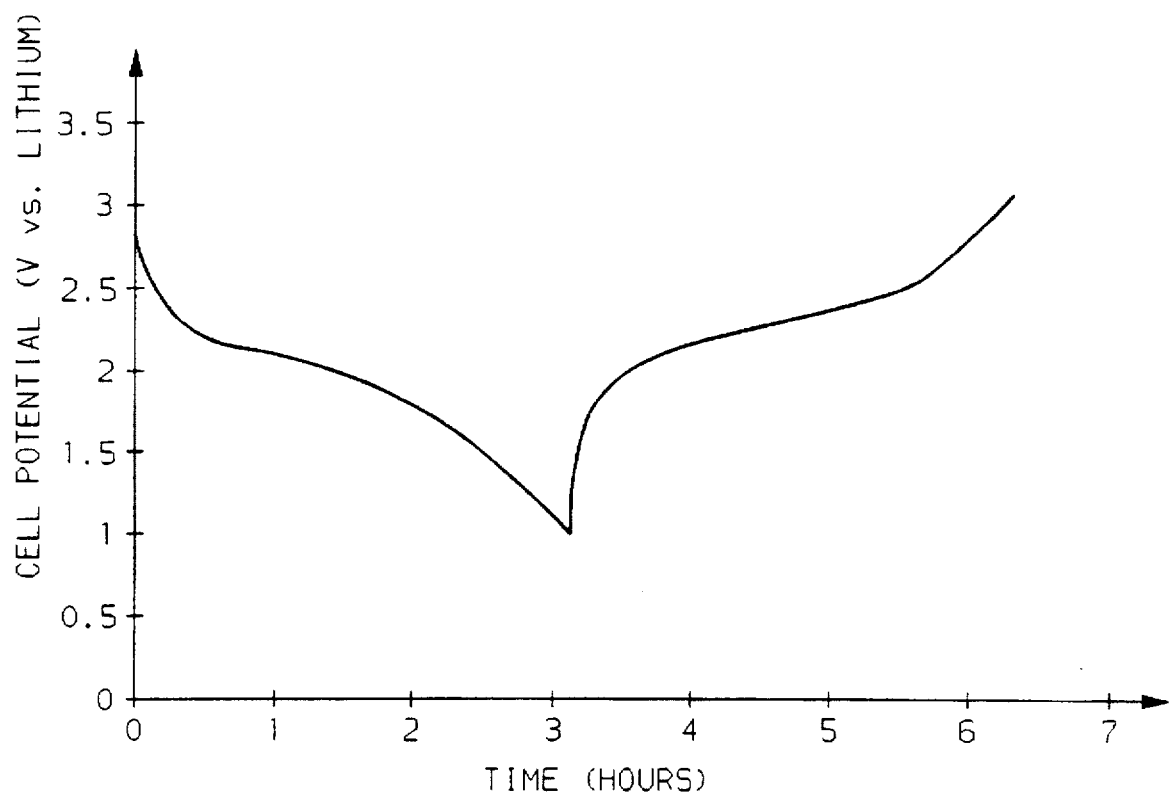
FIG. 14 is the voltage profile of the lithium ion cell of Example 7.
Figure 15:
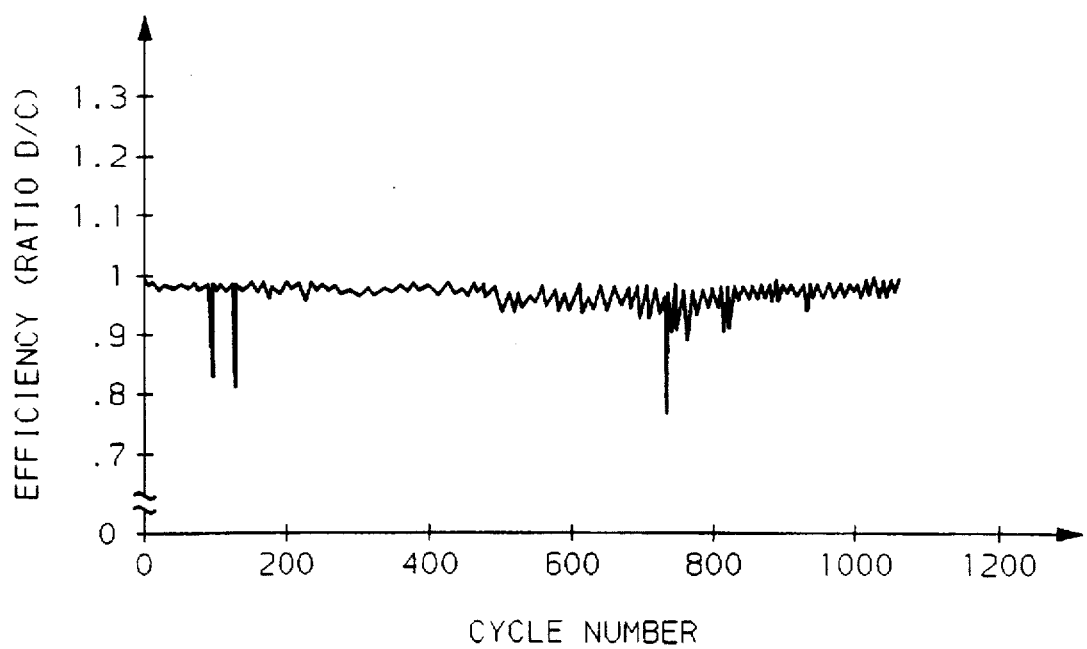
FIG. 15 is a plot of the cycling performance of the cell of Example 7 over a period of 1000 cycles.

A lithium-ion cell like that of FIG. 2 was constructed having a prelithiated PYROGRAF® anode, a lithium-loaded, vanadium oxide (i.e., Li$_6$V$_6$O$_{13}$) cathode and a glass mat separator saturated with a 1M LiClO$_4$ electrolyte in polypropylene carbonate. This cell was charged and discharged at a current density of 0.2 mA/cm$^2$ for over 1000 times. FIG. 14 shows the voltage profile of the second discharge-charge cycle between about 3 and 1.0 volts. The cycling performance of this same battery over 1000 cycles at 1 mA/cm² is shown in FIG. 15.

EXAMPLE 8

Figure 16:
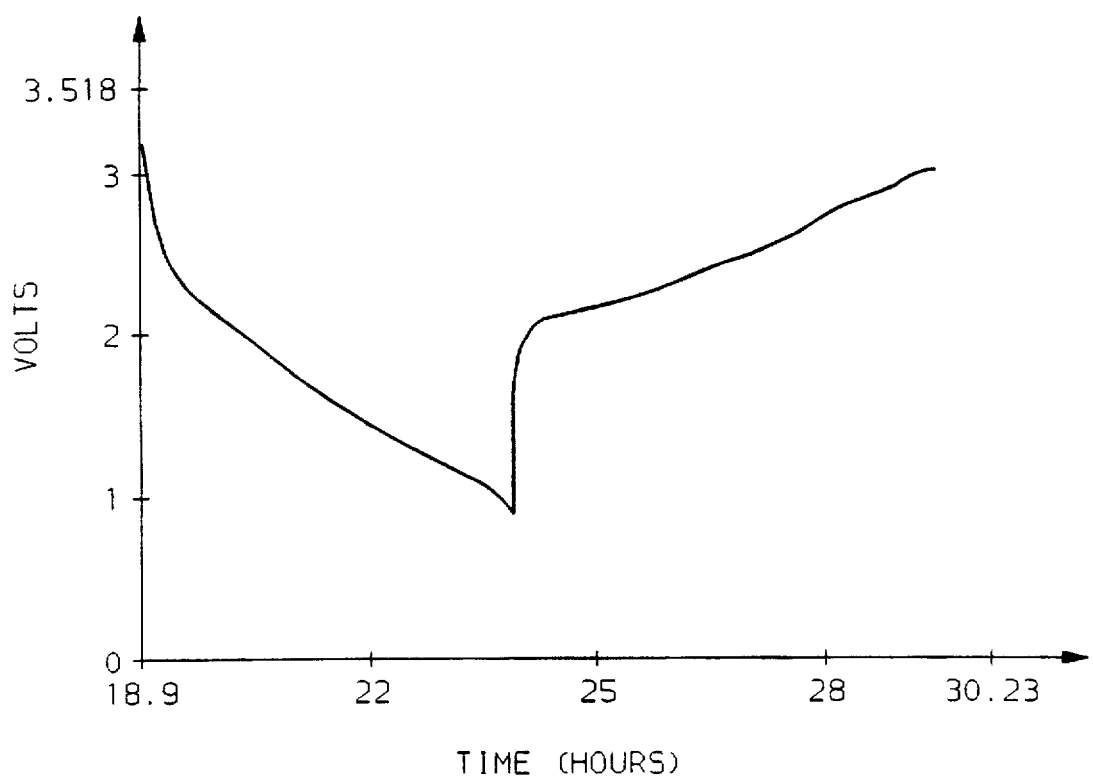
FIG. 16 is the voltage profile of the lithium ion cell of Example 8.

A test similar to that of Example 7 was performed with a lithium-loaded, molybdenum oxide cathode material. The voltage profile of the cell for the second cycle is shown in FIG. 16.

EXAMPLE 9

Figure 17:
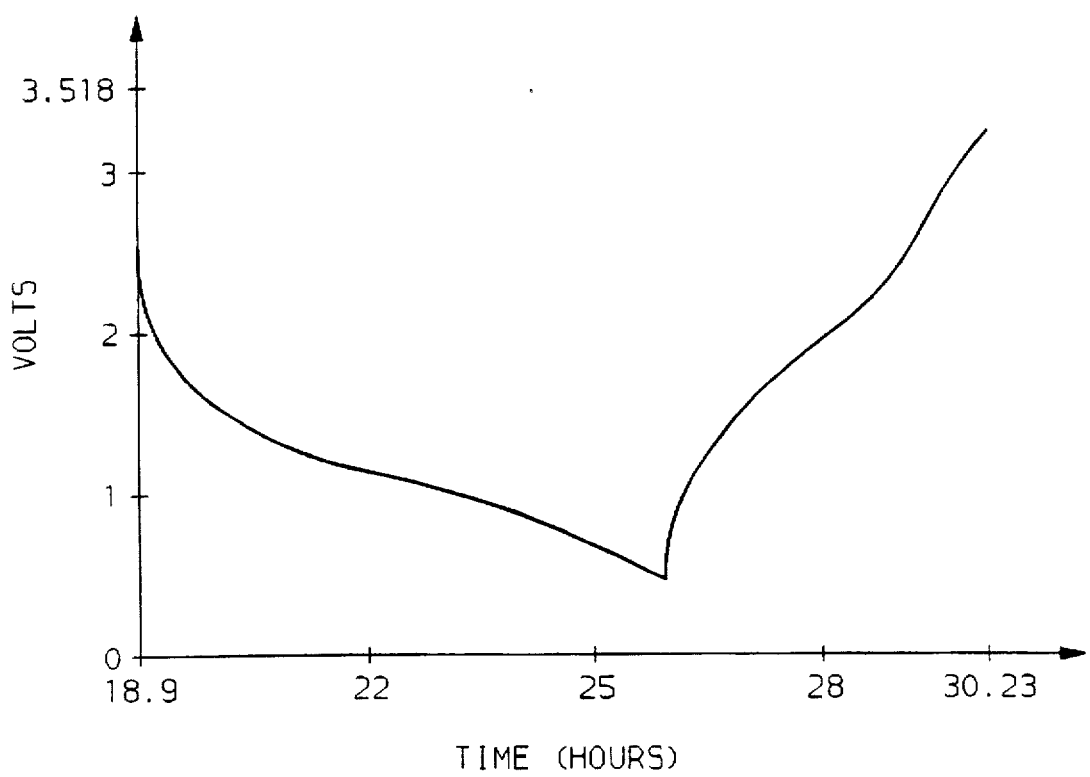
FIG. 17 is the voltage profile of the lithium ion cell of Example 9.

A test similar to Examples 7 and 8 was performed using a lithium-loaded, TiS₂ cathode material. The voltage profile of the cell for the second cycle is shown in FIG. 17.

While the invention has been described in connection with certain specific embodiments thereof, it is not intended to be limited thereto, but rather only to the extent set forth hereafter in the claims which follow.

What is claimed is:

1. In the method of assembling a secondary, lithium-ion cell in the substantially discharged state including the principle step of positioning an anode and a lithiated cathode opposite each other with a non-aqueous, lithium-ion-conducting, immobilized electrolyte therebetween, wherein said anode comprises lithium-intercalatable carbon and said lithiated cathode comprises a lithium-retentive material substantially saturated with a quantity of electrochemically reversible lithium species, the improvement comprising;

before said positioning, (a) initially cathodizing said carbon opposite a counterelectrode in a non-aqueous, lithium-ion-conducting solution so as to substantially saturate said carbon with said solution and electrolytically deposit enough lithium from said solution into said carbon to deactivate any active sites in said carbon yet leave said carbon with sufficient residual lithium capacity to reversibly intercalate said quantity of reversible lithium species, and (b) subsequently cathodizing said carbon in a non-aqueous, lithium-ion-conducting solution following said deactivation to intercalate a sufficient amount of lithium into said carbon to substantially compensate for any first cycle inefficiencies inherent in said lithium-retentive cathode material; and effecting said positioning while said carbon is still saturated with said electrolyte;

whereby assembly of a near-stoichiometrically balanced battery is made possible.

2. The method according to claim 1 wherein said solution and said electrolyte have substantially the same composition.

3. The method according to claim 1 wherein said cathodizing is effected at substantially constant current, the voltage between said anode and said counterelectrode is monitored, and said initial cathodizing continues until said voltage falls below the electrolytic decomposition potential of said solution, and said subsequent cathodizing is effected at a voltage below said decomposition potential.

4. The method according to claim 3 wherein said cathodizing is effected at a cathode current density of at least about 2.5 amps/cm².

5. The method according to claim 1 wherein said cathode material comprises a transition metal chalcogenide.

6. The method according to claim 1 wherein said initial cathodizing is effected at a substantially constant voltage, the current between the carbon and the counterelectrode is monitored, and said cathodizing continues until said current falls to about zero.

7. The method according to claim 6 wherein the initial cathodizing voltage is below the electrolytic decomposition potential of said solution.

8. The method according to claim 1 wherein said counterelectrode comprises lithium.

9. The method according to claim 5 wherein said transition metal chalcogenide is an oxide.

10. The method according to claim 1 wherein said electrolyte is substantially immobilized in a polymer matrix.

11. The method according to claim 7 wherein said solution comprises propylene carbonate and said voltage is less than about 0.6 volts.

12. The method according to claim 9 wherein said transition metal comprises manganese.

13. The method according to claim 10 wherein said cathode material comprises a transition metal oxide.

14. The method according to claim 13 wherein said transition metal is manganese.

15. The method according to claim 1 wherein said subsequent cathodizing is sufficient to intercalate said carbon with up to about ten percent, by weight, of the lithium capacity of the cathode material.

* * * * *